(12) United States Patent
Dahl

(10) Patent No.: US 7,280,801 B2
(45) Date of Patent: Oct. 9, 2007

(54) REDUCING INTERFERENCE BETWEEN DIFFERENT COMMUNICATION SYSTEMS SHARING A COMMON WIRELESS TRANSMISSION MEDIUM

(75) Inventor: Peter Anthony Dahl, Walhorn (BE)

(73) Assignee: Agere Systems Inc., Allentown, PA (US)

( * ) Notice: Subject to any disclaimer, the term of this patent is extended or adjusted under 35 U.S.C. 154(b) by 699 days.

(21) Appl. No.: 10/722,343

(22) Filed: Nov. 25, 2003

(65) Prior Publication Data

US 2004/0152416 A1    Aug. 5, 2004

Related U.S. Application Data

(60) Provisional application No. 60/430,448, filed on Dec. 2, 2002.

(51) Int. Cl.
*H04B 7/00* (2006.01)
(52) U.S. Cl. .............. 455/41.2; 455/448; 370/321; 370/336; 370/237; 370/230; 370/445
(58) Field of Classification Search .......... 455/42.1, 455/63.1, 41.2; 370/321, 336, 441–448, 370/449–462
See application file for complete search history.

(56) References Cited

U.S. PATENT DOCUMENTS

2002/0093929 A1* 7/2002 Mangold et al. ............ 370/336
2003/0128684 A1* 7/2003 Hirsch et al. ............... 370/338
2005/0239474 A9* 10/2005 Liang ......................... 455/454
2006/0246932 A1* 11/2006 Liang ......................... 455/515

FOREIGN PATENT DOCUMENTS

WO    WO 02/41586 A2    5/2002

\* cited by examiner

*Primary Examiner*—Edan Orgad
*Assistant Examiner*—Fayyaz Alam

(57) ABSTRACT

In one embodiment, a first wireless communication system conforms to the IEEE 802.15.3 standard and a second wireless communication system conforms to the IEEE 802.11 standard, where the two systems share a common wireless transmission medium. A combined node functions as both an IEEE 802.15.3 piconet controller and an IEEE 802.11 access point. The combined node transmits IEEE 802.11 control/management frames to inform other IEEE 802.11 nodes about the beginning and end of IEEE 802.11 contention free periods (CFPs), each of which purposely spans an IEEE 802.15.3 CFP and the following superframe beacon. As such, IEEE 802.15.3 nodes have unfettered access to the common wireless transmission medium during IEEE 802.15.3 CFPs, while allowing access by IEEE 802.11 nodes to the medium during IEEE 802.15.3 contention access periods, thereby avoiding destructive interference between IEEE 802.15.3 and IEEE 802.11 communications. Other embodiments are not necessarily limited to these particular wireless LAN standards.

24 Claims, 3 Drawing Sheets

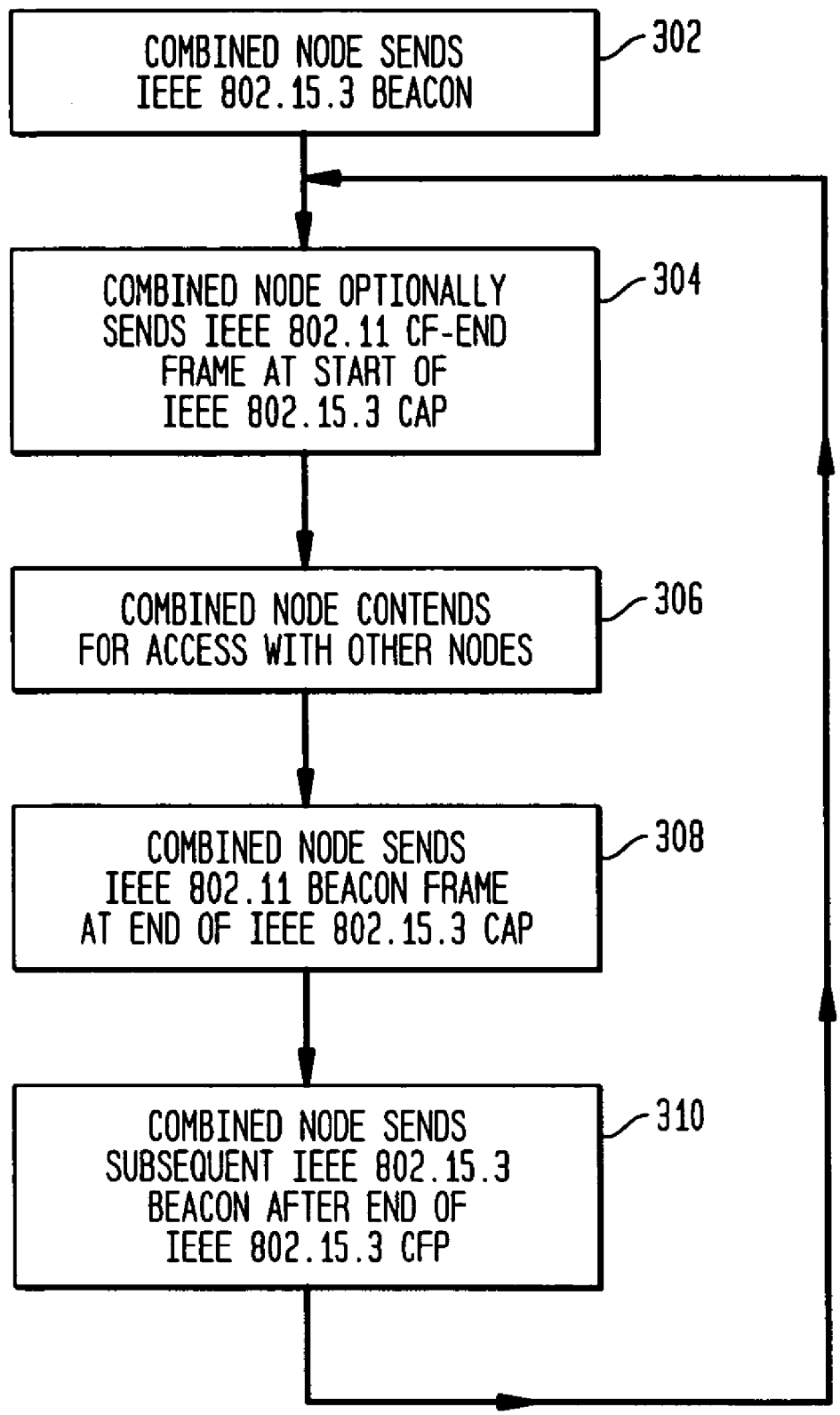

REDUCING INTERFERENCE BETWEEN DIFFERENT COMMUNICATION SYSTEMS SHARING A COMMON WIRELESS TRANSMISSION MEDIUM

CROSS-REFERENCE TO RELATED APPLICATIONS

This application claims the benefit of the filing date of U.S. provisional application No. 60/430,448, filed on Dec. 2, 2002 as attorney docket no. Dahl 1.

BACKGROUND OF THE INVENTION

1. Field of the Invention

The present invention relates to communication systems such as wireless local area networks (WLANs).

2. Description of the Related Art

IEEE 802.15.3 and IEEE 802.11, both of which are incorporated herein by reference in their entireties, are two standards directed to communications within WLANs. The IEEE 802.15.3 standard is designed to support isochronous streams for time-sensitive multimedia data, while the IEEE 802.11 standard is more suitable for asynchronous data that is less sensitive to delays in transmission. Although the IEEE 802.15.3 specification defines a completely different wireless physical (PHY) layer from that of the IEEE 802.11 specification, both standards define solutions for the 2.4 GHz Industrial, Scientific, Medical (ISM) band. There is, therefore, a high probability that devices employing the two standards will be used within range of one another and thereby cause mutual destructive interference.

LinCom Wireless of Los Angeles, Calif., proposed a coexistence method for IEEE 802.15.3 devices named "Harmony," in which an IEEE 802.15.3 device might detect and interpret the type and duration of a competing system's co-channel transmissions and remain off-the-air for that duration. Coexistence with IEEE 802.11a, IEEE 802.11b, and/or ETSI HipeRLAN-2 systems might be achieved in this way. This technique would require an IEEE 802.15.3 system to defer channel access to other standards-based systems, which would severely effect the ability of the IEEE 802.15.3 system to reliably deliver time-sensitive streams of multimedia data.

Mobilian Corporation of Hillsboro, Oreg., proposed and implemented a collaborative coexistence method for IEEE 802.11b devices and devices conforming to the Bluetooth specification. Part of this solution involves time-slicing the use of the Bluetooth and IEEE 802.11 media access rules within a combined radio device to ensure minimal destructive interference between the radios. This technique simply manages and mitigates destructive interference caused by a single device (e.g., a laptop computer) that simultaneously uses both an IEEE 802.11b radio and a Bluetooth radio. The solution does not involve informing nearby IEEE 802.11 devices of the need to remain quiescent for the duration of the Bluetooth radio's transmissions.

SUMMARY OF THE INVENTION

Problems in the prior art are addressed in accordance with the principles of the present invention by a technique that protects IEEE 802.15.3 data streams from IEEE 802.11 transmissions, but also provides opportunities for the IEEE 802.11 system to transmit data. Certain embodiments of the present invention ensure that adjacent IEEE 802.11 devices will not attempt to access the wireless channel when IEEE 802.15.3 devices are transmitting data. These embodiments ensure that the IEEE 802.15.3 system has full use of its "contention free period" to reliably transmit time-sensitive multimedia data streams without the risk of interruption from an IEEE 802.11 device. The invention can be implemented for devices utilizing two sets of media access rules over a common wireless physical layer as well as for devices that employ separate but co-channel 802.11 and 802.15.3 physical layers. The principles of these embodiments can also be extended to implement the present invention for devices conforming to standards other than IEEE 802.15.3 and/or other than IEEE 802.11. In general, the present invention can be implemented to address the problem of co-existence of data emitters that employ mutually incompatible media access rules to communicate over the same wireless transmission medium.

In one embodiment, the present invention is a method for reducing interference between two or more communication systems that share a common wireless transmission medium. The method comprises transmitting one or more messages conforming to a first communication standard associated with a first of the communication systems. The one or more messages are designed to notify one or more nodes conforming to the first communication standard of the existence of a contention free period (CFP) for the first communication system, where the CFP for the first communication system spans a CFP for a second of the communication systems conforming to a second communication standard different from the first communication standard.

In another embodiment, the present invention is a method for reducing interference between two or more communication systems that share a common wireless transmission medium. The method comprises transmitting one or more messages conforming to a first communication standard associated with a first of the communication systems. The one or more messages are designed to notify one or more nodes conforming to the first communication standard of the existence of a contention access period (CAP) for the first communication system, where the CAP for the first communication system falls within a CAP for a second of the communication systems conforming to a second communication standard different from the first communication standard.

Either method may be implemented in a combined node comprising (a) a first transceiver conforming to a first communication standard; (b) a second transceiver conforming to a second communication standard different from the first communication standard; and (c) a controller adapted to coordinate operations of the first and second transceivers. The first transceiver is part of a first communication system conforming to the first communication standard, while the second transceiver is part of a second communication system conforming to the second communication standard, where the first and second communication systems share a common wireless transmission medium.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3 shows a flow diagram of processing implemented by the combined node of FIG. 1, according to one embodiment of the present invention.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
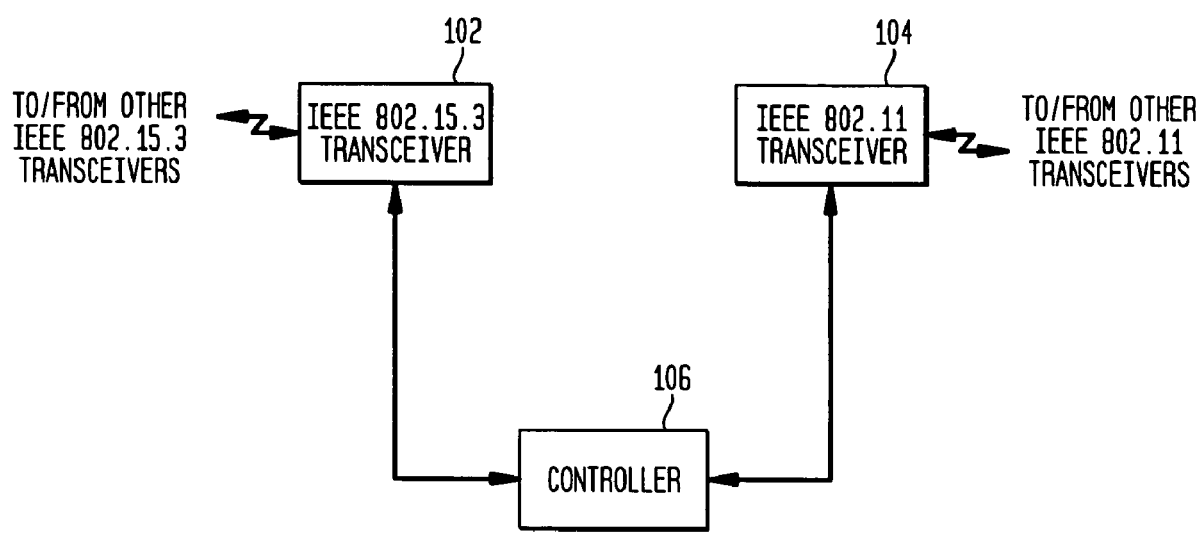
FIG. 1 shows a high-level block diagram of a combined IEEE 802.15.3/IEEE 802.11 node, according to one embodiment of the present invention.

FIG. 1 shows a high-level block diagram of a combined node 100 that supports both IEEE 802.15.3 and IEEE 802.11 communications, according to one embodiment of the present invention. As shown in FIG. 1, node 100 includes an IEEE 802.15.3 transceiver 102, an IEEE 802.11 transceiver 104, and a controller 106 suitable for coordinating the operations of both transceivers 102 and 104.

IEEE 802.15.3 transceiver 102 functions as a piconet controller (PNC) for an IEEE 802.15.3 system that includes transceiver 102 and one or more other IEEE 802.15.3 transceivers (not shown). As defined in the IEEE 802.15.3 specification, a PNC is responsible for the equitable time-sharing of the wireless media based on periodic superframes.

Figure 2:
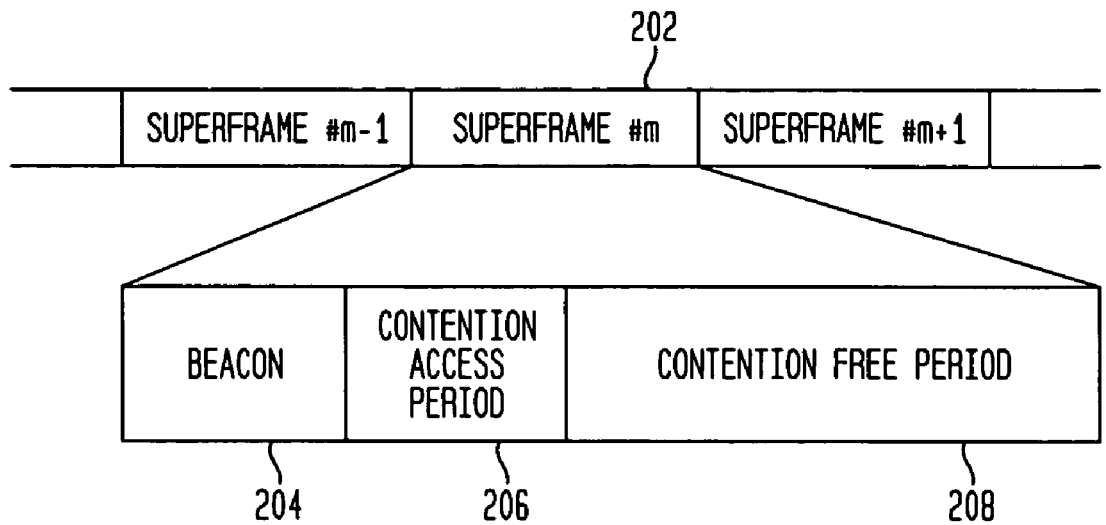
FIG. 2 represents a portion of a sequence of IEEE 802.15.3 superframes.

FIG. 2 represents a portion of a sequence of IEEE 802.15.3 superframes 202. As indicated in FIG. 2, each superframe consists of a beacon 204, a contention access period (CAP) 206, and a contention free period (CFP) 208, which is further sub-divided into channel time allocation (CTA) periods (not shown).

Referring again to FIG. 1, IEEE 802.11 transceiver 104 functions as an access point (AP) for an IEEE 802.11 system that includes transceiver 104 and one or more other IEEE 802.11 transceivers (not shown). As defined for the "infrastructure" mode of operation of the IEEE 802.11 specification, one station (typically, an AP) sends periodic beacons that communicate certain basic parameters for the associated "basic service area." The IEEE 802.11 beacons may also be used to notify adjacent IEEE 802.11 transceivers of the beginning of a contention free period, during which time the transceivers should refrain from attempting to access the wireless channel, unless polled to do so.

Note that, in general, each "other" IEEE 802.15.3 transceiver in the IEEE 802.15.3 system with combined node 100 may be part of a node that also has an IEEE 802.11 transceiver, and vice versa, although each of those other nodes is not necessarily operated as—or even capable of operating as—an IEEE 802.15.3 piconet controller or an IEEE 802.11 access point.

According to certain embodiments of the present invention, controller 106 coordinates the operations of transceivers 102 and 104 to achieve collaborative co-existence of the IEEE 802.15.3 system and the IEEE 802.11 system. In particular, a preferred embodiment employs the CFP notification mechanisms of the IEEE 802.11 standard to inform IEEE 802.11 compliant transceivers within range of a node acting simultaneously as an IEEE 802.11 AP and as an IEEE 802.15.3 PNC (e.g., node 100), to remain quiescent for the duration of the following IEEE 802.15.3 CFP and beacon.

FIG. 3 shows a flow diagram of processing implemented by combined node 100 of FIG. 1, according to one embodiment of the present invention. The processing begins with transceiver 102 of node A transmitting an IEEE 802.15.3 beacon to begin the process of establishing an IEEE 802.15.3 piconet (step 302 of FIG. 3).

At the start of the IEEE 802.15.3 contention access period following the beacon (e.g., CAP 206 following beacon 204 in FIG. 2), transceiver 104 of FIG. 1 may send an IEEE 802.11 CF-End frame (step 304). This frame may be sent over a separate IEEE 802.11 compliant wireless PHY layer, or it may be sent over a common PHY layer if one is available for both sets of media access rules. If an IEEE 802.11 CF-End frame is transmitted, then the IEEE 802.15.3 contention access period becomes available for IEEE 802.11 transceivers (including transceiver 104) that may have data to transmit, with media access controlled by standard IEEE 802.11 MAC-layer specifications. During the period following the transmission of an IEEE 802.11 CF-End frame, IEEE 802.11 compliant stations use a Carrier Sense Multiple Access/Collision Avoidance (CSMA/CA) scheme to gain access to the wireless medium.

During this IEEE 802.15.3 CAP, both IEEE 802.11 and IEEE 802.15.3 transceivers (including those of node 100) are able to contend for access to the common wireless medium (step 306). Depending on the implementation, an IEEE 802.11 station can determine that the common wireless medium is busy (i.e., being used by another station) by (a) detecting that the received energy level is above a specified threshold or (b) detecting the presence of a Direct Sequence Spread Spectrum (DSSS) signal or (c) both. IEEE 802.15.3 stations may employ analogous processing to determine that the common wireless medium is busy. Depending on the implementation, within node 100, both IEEE 802.15.3 transceiver 102 and IEEE 802.11 transceiver 104 may contend for access or one of the transceivers (e.g., IEEE 802.15.3 transceiver 102) may defer to the other, for example, as controlled by controller 106.

At the end of the IEEE 802.15.3 contention access period, transceiver 104 sends an IEEE 802.11 beacon frame that contains the CF parameter set element defining the beginning of an IEEE 802.11 contention free period to protect the subsequent IEEE 802.15.3 CFP and subsequent beacon (i.e., corresponding to the next IEEE 802.15.3 superframe) (step 308). As with the IEEE 802.11 beacon frame of step 304, this beacon frame may be sent over a separate IEEE 802.11 compliant wireless PHY layer, or it may be sent over a common PHY layer if one is available for both sets of media access rules. As such, the IEEE 802.15.3 contention free period (as well as the subsequent beacon period) is also designated as an IEEE 802.11 contention free period, during which all IEEE 802.11 transceivers within range will remain quiescent, giving the IEEE 802.15.3 transceivers (including transceiver 102) full, uninterrupted use of the IEEE 802.15.3 contention free period.

Following the end of the IEEE 802.15.3 CFP, transceiver 102 sends the subsequent IEEE 802.15.3 beacon (i.e., for the next superframe) (step 310). At this point, processing returns to step 304, where the option exists for transceiver 104 to transmit another IEEE 802.11 CF-End frame at the start of the subsequent IEEE 802.15.3 contention access period.

Figure 4:
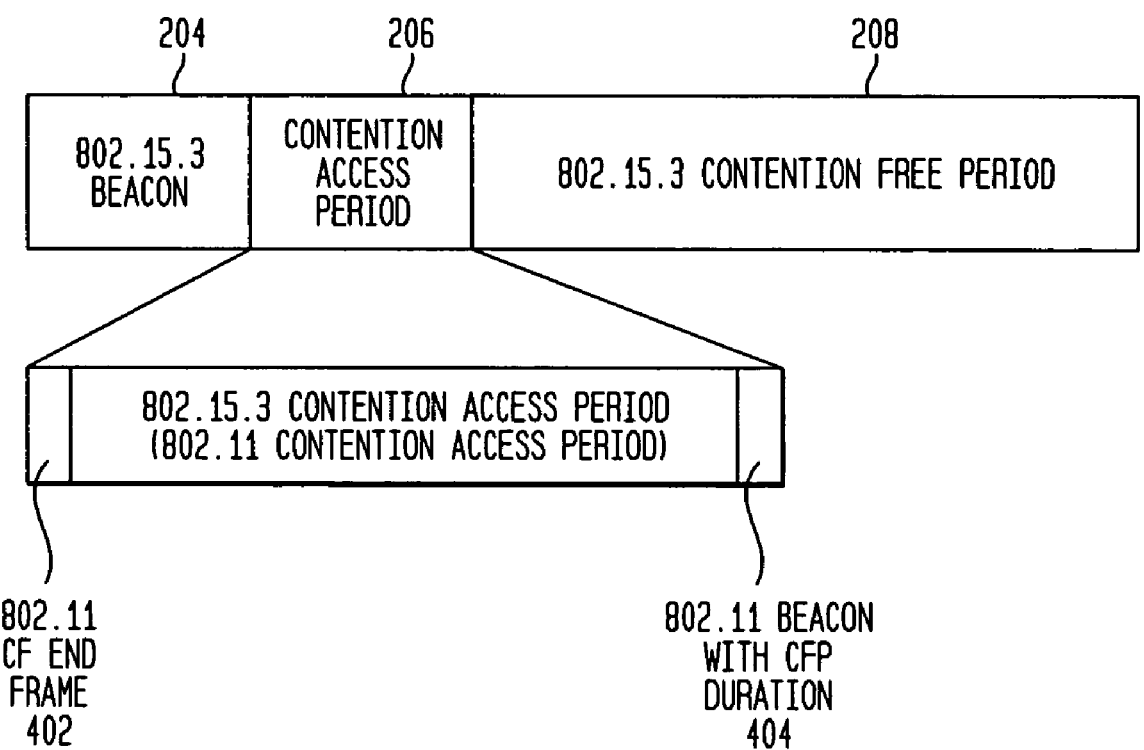
FIG. 4 represents the relative timing of IEEE 802.11 contention free period notification frames within an IEEE 802.15.3 superframe, according to the processing of FIG. 3.

FIG. 4 represents the relative timing of the IEEE 802.11 CFP notification frames within an IEEE 802.15.3 superframe, according to the processing of FIG. 3. In particular, an IEEE 802.11 CF-End frame 402 occurs at the start of IEEE 802.15.3 contention access period 206, while an IEEE 802.11 beacon frame 404 with CFP duration occurs at the end of IEEE 802.15.3 CAP 206.

The processing of FIG. 3 corresponds to a scenario in which the combined node transmits two types of IEEE 802.11 control/management frames: an initial beacon frame (e.g., 404 of FIG. 4 transmitted at the end of an IEEE 802.15.3 CAP) indicating the beginning of an IEEE 802.11 contention free period and a subsequent CF-End frame (e.g., 402 of FIG. 4 transmitted at the beginning of the subsequent IEEE 802.15.3 CAP) indicating the end of that IEEE 802.11 CFP. An example of a CF-End frame is shown in Section 7.2.1.5 of the IEEE 801.11 standard, while a beacon is shown in Section 7.2.3.1 of the same standard. The present invention can be implemented using different scenarios.

For example, according to one alternative scenario, the initial beacon frame can explicitly indicate the duration of the IEEE 802.11 CFP, in which case, a subsequent control/management frame indicating the end of the CFP is not required. In this case, each IEEE 802.11 transceiver receiving the initial beacon frame maintains it own timer based on the specified CFP duration to determine when the CFP is over.

In another scenario, the initial beacon frame announces the beginning of an IEEE 802.11 CFP, but does not explicitly indicate its duration. In this case, the subsequent control/management frame is used to announce the end of the CFP. Those skilled in the art will appreciate that other scenarios may be possible.

Although the present invention has been described in the context of IEEE 802.11 control/management frames that are transmitted during IEEE 802.15.3 contention access periods, the invention is not so limited. For example, for implementations in which the IEEE 802.11 control/management frames are transmitted over separate channels that will not interfere with any IEEE 802.15.3 communications, the timing of the IEEE 802.11 control/management frames does not have to be constrained to fall within IEEE 802.15.3 CAPs, as long as the IEEE 802.11 CFP established by those control/management frames, spans the IEEE 802.15.3 CFP (and subsequent beacon). In addition, in theory, the roles of IEEE 802.11 and IEEE 802.15.3 can be reversed, whereby IEEE 802.15.3 transceivers are prevented from transmitting during IEEE 802.11 contention free periods.

All of these different implementations allow both IEEE 802.15.3 and IEEE 802.11 systems to co-exist in the same space without experiencing mutually destructive interference. The invention can protect IEEE 802.15.3 contention free periods, which are typically used for the delivery of time-sensitive streams of multimedia data, from the destructive interference of adjacent IEEE 802.11 nodes. The invention can provide periodic opportunities for the IEEE 802.11 nodes to transmit their pending data during IEEE 802.15.3 contention access periods. The invention may be used whether the different sets of media access rules employ a common wireless PHY layer or whether they employ separate PHY layers.

Although the present invention has been described in the context of co-existence between two systems, one conforming to the IEEE 802.15.3 standard and the other conforming to the IEEE 802.11 standard, the invention is not so limited. In alternative embodiments, one or both of the systems may conform to other WLAN standards. Moreover, the present invention can be implemented in the context of co-existence between more than two WLAN systems. Furthermore, the present invention can be implemented in systems other than WLANs, such as wireless wide area networks (WWANs).

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A method for reducing interference between two or more communication systems that share a common wireless transmission medium, the method comprising:

transmitting one or more first-standard messages conforming to a first communication standard associated with a first of the communication systems in a first-standard beacon period for the first communication standard, wherein:

the one or more first-standard messages are designed to notify one or more nodes conforming to the first communication standard of (1) the existence of a contention free period (CFP) for the first communication system and (2) the existence of a contention access period (CAP) for the first communication system; and transmitting one or more second-standard messages conforming to a second communication standard different from the first communication standard, associated with a second of the communication systems in a second-standard beacon period for the second communication standard, wherein:

the one or more second-standard messages are designed to notify one or more nodes conforming to the second communication standard of (1) the existence of a CFP for the second communication system and (2) the existence of a CAP for the second communication system; and timing of the CFPs and CAPs for the first and second communication systems is coordinated such that;
a CFP for the first communication system spans (1) a CFP for the second communication system and (2) a second-standard beacon period; and
a CAP for the second communication system spans (1) a CAP for the first communication system and (2) a first-standard beacon period.

2. The invention of claim 1, wherein each node conforming to the first communication standard is allowed to contend for access to the common wireless transmission medium only during the CAPs for the second communication standard.

3. The invention of claim 1, wherein:
the one or more first-standard messages enable the one or more nodes conforming to the first communication standard to access the common wireless transmission medium during a CAP for the second communication system; and
the one or more first-standard messages disable the one or more nodes conforming to the first communication standard from accessing the common wireless transmission medium during each CFP for the second communication system.

4. The invention of claim 1, wherein transmitting the one or more first-standard messages comprises transmitting a first message conforming to the first communication standard to notify the one or more nodes conforming to the first communication standard of the beginning of the CFP for the first communication system.

5. The invention of claim 4, wherein the first message is transmitted at the end of a CAP for the second communication system.

6. The invention of claim 4, wherein the first message identifies the duration of the CFP for the first communication system.

7. The invention of claim 4, wherein transmitting the one or more first-standard messages further comprises transmitting a second message conforming to the first communication standard to notify the one or more nodes conforming to the first communication standard of the end of the CFP for the first communication system.

8. The invention of claim 7, wherein the second message is transmitted at the beginning of a subsequent CAP for the second communication system.

9. The invention of claim 1, wherein:
the common wireless transmission medium is a wireless channel;
the first communication standard is IEEE 802.11; and
the second communication standard is IEEE 802.15.3.

10. The invention of claim 9, wherein the first and second messages are transmitted from a node that functions as both an IEEE 802.11 access point and an IEEE 802.15.3 piconet controller.

11. The invention of claim 1, further comprising transmitting a beacon frame for the second communication system after the end of the CFP for the second communication system.

12. The invention of claim 1, wherein the one or more messages are transmitted over the common wireless transmission medium.

13. A combined node comprising:
(a) a first transceiver conforming to a first communication standard;
(b) a second transceiver conforming to a second communication standard different from the first communication standard; and
(c) a controller adapted to coordinate operations of the first and second transceivers, wherein:
the first transceiver is part of a first communication system conforming to the first communication standard;
the second transceiver is part of a second communication system conforming to the second communication standard;
the first and second communication systems share a common wireless transmission medium;
the first transceiver is adapted to transmit one or more first-standard messages conforming to the first communication standard, wherein:
the one or more first-standard messages are designed to notify one or more other nodes conforming to the first communication standard of (1) the existence of a contention free period (CFP) for the first communication system and (2) the existence of a contention access period (CAP) for the first communication system;
the second transceiver is adapted to transmit one or more second-standard messages conforming to the second communication standard, wherein:
the one or more second-standard messages are designed to notify one or more other nodes conforming to the second communication standard of (1) the existence of a CFP for the second communication system and (2) the existence of a CAP for the second communication system, CHARACTERIZED IN THAT the controller is adapted to coordinate timing of the CFPs and CAPs for the first and second communication systems such that:
a CFP for the first communication system spans (1) a CFP for the second communication system and (2) a second-standard beacon period; and
a CAP for the second communication system spans (1) a CAP for the first communication system and (2) a first-standard beacon period.

14. The invention of claim 13, wherein each node conforming to the first communication standard is allowed to contend for access to the common wireless transmission medium only during the CAPs for the second communication standard.

15. The invention of claim 13, wherein:
the one or more messages enable the one or more nodes conforming to the first communication standard to access the common wireless transmission medium during a contention access period (CAP) for the second communication system; and
the one or more messages disable the one or more nodes conforming to the first communication standard from accessing the common wireless transmission medium during each CFP for the second communication system.

16. The invention of claim 13, wherein the first transceiver is adapted to transmit a first message conforming to the first communication standard to notify the one or more nodes conforming to the first communication standard of the beginning of the CFP for the first communication system.

17. The invention of claim 16, wherein the first message is transmitted at the end of a CAP for the second communication system.

18. The invention of claim 16, wherein the first message identifies the duration of the CFP for the first communication system.

19. The invention of claim 16, wherein the first transceiver is further adapted to transmit a second message conforming to the first communication standard to notify the one or more nodes conforming to the first communication standard of the end of the CFP for the first communication system.

20. The invention of claim 19, wherein the second message is transmitted at the beginning of a subsequent CAP for the second communication system.

21. The invention of claim 13, wherein:
the common wireless transmission medium is a wireless channel;
the first communication standard is IEEE 802.11; and
the second communication standard is IEEE 802.15.3.

22. The invention of claim 21, wherein:
the first transceiver functions as an IEEE 802.11 access point;
the second transceiver functions as an IEEE 802.15.3 piconet controller.

23. The invention of claim 13, wherein the second transceiver is adapted to transmit a beacon frame for the second communication system after the end of the CFP for the second communication system.

24. The invention of claim 13, wherein the one or more messages are transmitted over the common wireless transmission medium.

* * * * *